United States Patent [19]

Kataumi et al.

[11] Patent Number: 5,497,673
[45] Date of Patent: Mar. 12, 1996

[54] AUTOMATIC TRANSMISSION OPERATING DEVICE

[75] Inventors: Yoshimasa Kataumi; Yasuyuki Ikegami, both of Kosai, Japan

[73] Assignee: Fuji Kiko Co., Ltd., Tokyo, Japan

[21] Appl. No.: 186,956

[22] Filed: Jan. 27, 1994

[30] Foreign Application Priority Data

Jan. 29, 1993 [JP] Japan .................. 5-002073 U

[51] Int. Cl.⁶ .................. B60K 41/04; B60K 20/00
[52] U.S. Cl. .................. 74/473 R; 74/475; 74/538; 403/354; 29/434
[58] Field of Search .................. 74/473 R, 538, 74/475; 403/354; 29/434

[56] References Cited

U.S. PATENT DOCUMENTS

| | | | |
|---|---|---|---|
| 3,902,378 | 9/1975 | Osborn | 74/475 |
| 4,492,017 | 1/1985 | Latter | 29/434 |
| 4,506,560 | 3/1985 | Treichel et al. | 74/473 R |
| 5,079,966 | 1/1992 | Ishizuki et al. | |
| 5,277,077 | 1/1994 | Osborn | 29/434 |
| 5,317,796 | 6/1994 | Hunter | 29/434 |
| 5,372,051 | 12/1994 | Kanematsu et al. | 74/473 R |

FOREIGN PATENT DOCUMENTS

| | | |
|---|---|---|
| 0378244 | 7/1990 | European Pat. Off. . |
| 2414659 | 8/1979 | France . |
| 904721 | 2/1954 | Germany . |
| 2-77358 | 6/1990 | Japan . |

*Primary Examiner*—Charles A. Marmor
*Assistant Examiner*—David Fenstermacher
*Attorney, Agent, or Firm*—Lowe, Price, LeBlanc & Becker

[57] ABSTRACT

An automatic transmission operating device for changing an operating range of an automatic transmission mounted on an automotive vehicle. The automatic transmission operating device comprises a pair of bearing sections which are located separate from each other and fixedly connected to a base fixed to a vehicle floor. Each bearing section includes a generally cylindrical portion having a generally C-shaped cross-section so as to define a cutout groove. A base member for a shift lever is provided including a shaft section which is formed at its opposite ends with a pair of end projections. The end projections are rotatably disposed respectively inside the cylindrical portions of the bearing sections. Each end projection is generally oval-shape in cross-section so as to form two opposite end faces and two opposite side faces. The end faces are in sliding contact with the inner surface of the cylindrical portion of the bearing section. The distance between the two opposite end faces is larger than the width of the cutout groove, so that the end projection can be prevented from dropping off through the cutout groove after being fitted inside the cylindrical portion of the bearing section.

12 Claims, 5 Drawing Sheets

AUTOMATIC TRANSMISSION OPERATING DEVICE

BACKGROUND OF THE INVENTION

1. Field of the Invention

This invention relates to improvements in an operating device for an automatic transmission of an automotive vehicle, and more particularly to a bearing arrangement through which a base member of a shift lever is rotatably supported on a stationary base.

2. Background of the Related Art

Figure 8:
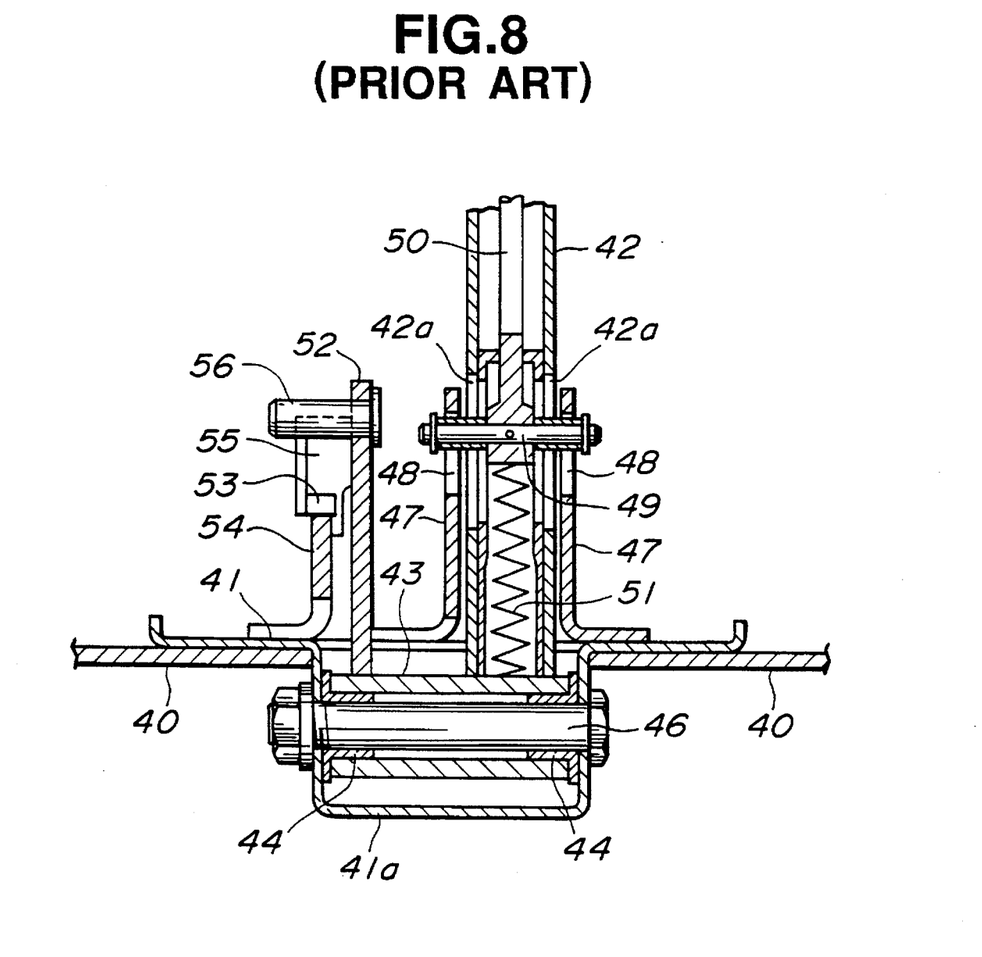
FIG. 8 is a vertical sectional view of a conventional automatic transmission operating device.

A known automatic transmission operating device for changing operating ranges of an automatic transmission of an automotive vehicle is, in general, arranged as shown in FIG. 8. In FIG. 8, the automatic transmission operating device includes a shift lever 42 which is perpendicularly connected to a collar 43 which is mounted through bushings 44, 44 on a shaft 46 secured horizontally to a depressed section 41a of a base 41 fixed to a floor panel 40 of the automotive vehicle. Thus, the shift lever 42 of the automatic transmission operating device is arranged to be rotatable or tillable with respect to the base 41. Right and left positioning plates 47, 47 are provided at opposite sides of the shift lever 42 and fixed to the base 41 to vertically extend. A positioning pin 49 is provided to pass through the elongate openings 42a, 42a of the shift lever 42 so as to be vertically movable, and is in slidable contact with the detent grooves 48, 48 of the positioning plates 47, 47.

A compression rod 50 is vertically movably disposed in the shift lever 42 and connected with the positioning pin 49. The compression rod 50 is always pushed upwardly under the action of a spring 51 and can be pushed down by a push button provided in a knob (not shown) fixedly mounted on the upper end of the shift lever 42. A check plate 54 is disposed parallel with the positioning plates 47, 47 and fixed to the base 41. A roller 53 provided to a check lever 52 is in sliding contact with the check plate 54. The check lever 52 is moved in timed relation to the shift lever 42. The roller 53 is rotatably supported on an arm 55 which is swingably attached to the check lever 52. The arm 55 is in pressing contact with the check plate 54 under the action of a spring (not shown). A cable (not shown) for operating the automatic transmission is anchored to a pin 56 secured to the check plate 54.

However, difficulties have been encountered in the above conventional automatic transmission operating device in that the above automatic transmission operating device requires the shaft 46 and the bushings 44 in addition to the collar 43 thereby increasing the number of component parts. This unavoidably increases the number of operational steps in a production process, thus raising the production cost.

SUMMARY OF THE INVENTION

It is a principal object of the present invention to provide an improved automatic transmission operating device which can overcome drawbacks encountered in conventional automatic transmission operating devices.

Another object of the present invention is to provide an improved automatic transmission operating device which is reduced in the number of its component parts, and facilitates in manufacturing assembly operation as compared with the conventional automatic transmission operating devices.

An automatic transmission operating device according to a preferred embodiment of the present invention is provided for changing an operating range of an automatic transmission mounted on a vehicle and comprises a base fixedly secured to a floor of the vehicle. First and second bearing sections are fixedly connected to the base and are located apart from each other. Each bearing section includes a generally cylindrical portion having a generally C-shaped cross-section so as to define a cutout groove. A shift lever is provided to select the operating range of the automatic transmission. A base member to which the shift lever is fixedly connected is provided including a shaft section having first and second ends. First and second end projections respectively axially project from the first and second ends. The first and second end projections are rotatably disposed respectively inside the cylindrical portions of the first and second bearing sections. Each end projection is generally oval-shaped in cross-section so as to form two opposite end faces and two opposite side faces. The end faces are in sliding contact with the inner surface of the cylindrical portion of the bearing section. The distance between the two opposite end faces is larger than the width of the cutout groove.

The above automatic transmission operating device may be assembled in a process comprising the following steps: locating each end projection at a predetermined angular position at which one of the end faces of the shaft section end projection of the base member faces the cutout groove; inserting each end projection into the cylindrical portion of the corresponding bearing section through the cutout groove; and rotating the base member to an extent that the end face of each end projection becomes positioned outside the predetermined angular position.

The above automatic transmission operating device has a reduced number of component parts as compared with conventional automatic transmission operating devices. The assembly operation of the shift lever and the base member into the base is accomplished merely by inserting the end projection of the base member into the bearing section through the cutout groove, thereby greatly facilitating the assembly operation of the automatic transmission operating device.

DETAILED DESCRIPTION OF THE PREFERRED EMBODIMENTS

Figure 1:
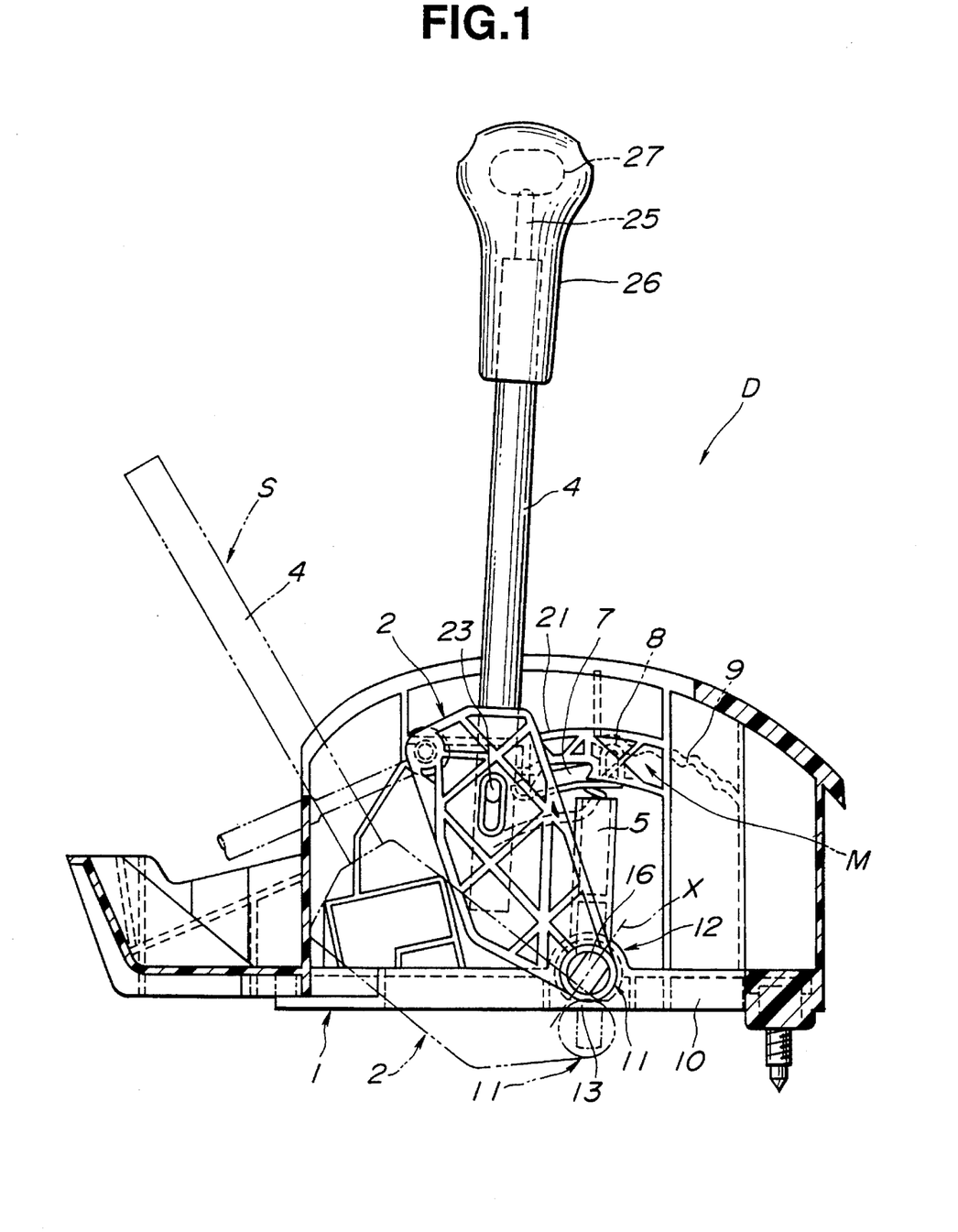
FIG. 1 is a vertical cross-sectional view of an embodiment of an automatic transmission operating device according to the present invention.
Figure 2:
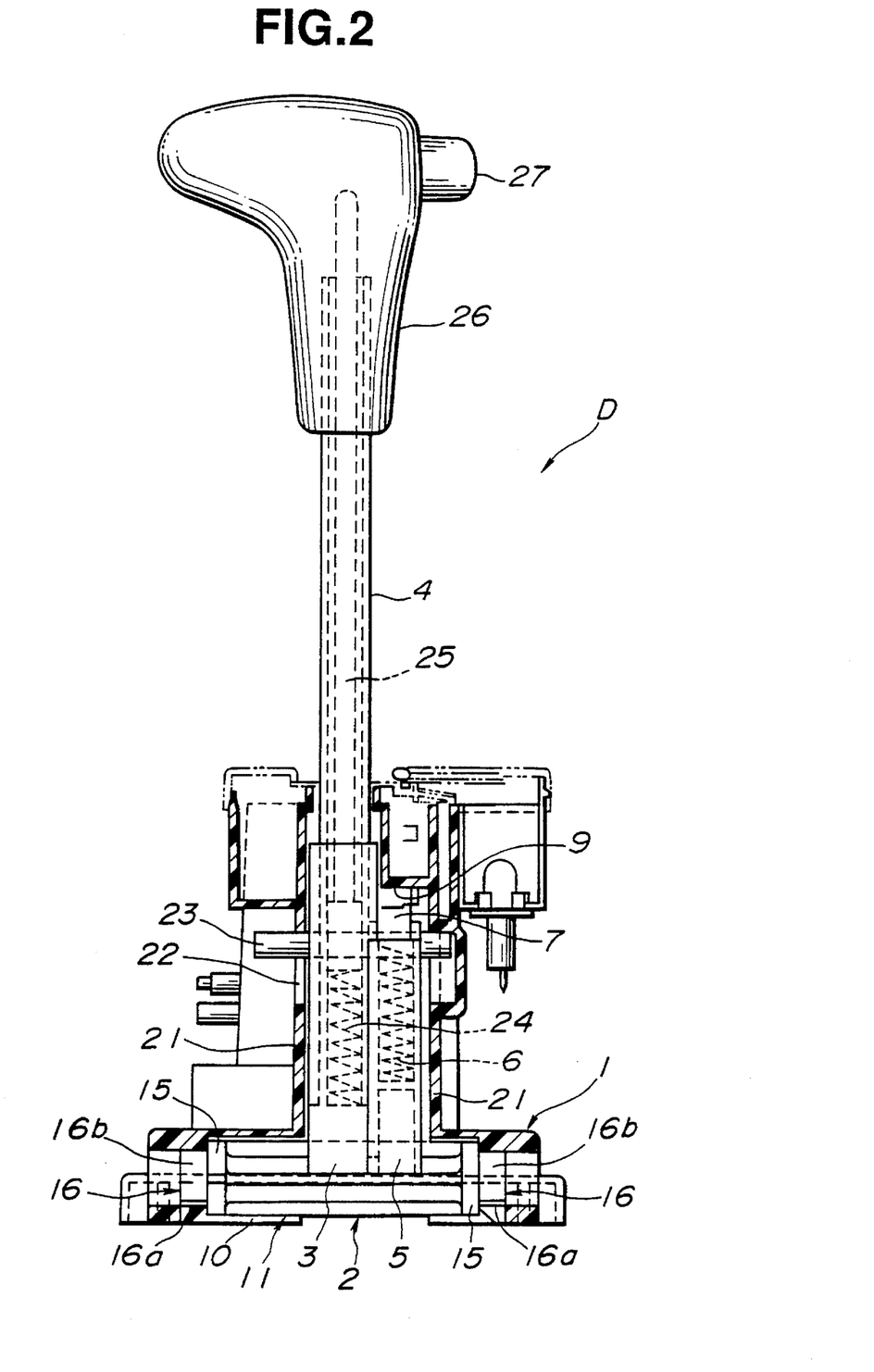
FIG. 2 is a front elevation, partly in section, of the automatic transmission operating device of FIG. 1.

Referring now to FIGS. 1 and a preferred embodiment of an operating device for an automatic transmission (not shown), according to the present invention is identified by the reference character D. The automatic transmission in this embodiment is mounted on an automotive vehicle (not shown). The operating device D comprises a base 1 fixedly secured to a floor (not shown) of a vehicle body of the automotive vehicle. A base member 2 for a shift lever 4 is rotatably supported by the base 1 and formed with two cylindrical sections 3, 5 which are parallel with each other and extend upwardly.

The shift lever 4 forming part of the operating device D is inserted at its lower section into the cylindrical section 3. A spring 6 is disposed in the cylindrical section 5 and has an upper end projected over the upper end of the cylindrical section 5. The projected upper end of the spring 6 is in contact with an arm 7 which is pivotally supported to the base member 2 to be swingable, so that the arm 7 is biased by the spring 6. The arm 7 is formed at its end portion with a projection 8 having a contacting surface which is arcuate in cross-section. The contacting surface of the projection 8 is in slidable contact with one of a plurality of check grooves 9 each having an arcuate cross-section so as to be engaged with the contacting surface of the projection 8. The check grooves 9 are formed at a part of the base 1.

Figures 3, 3A:
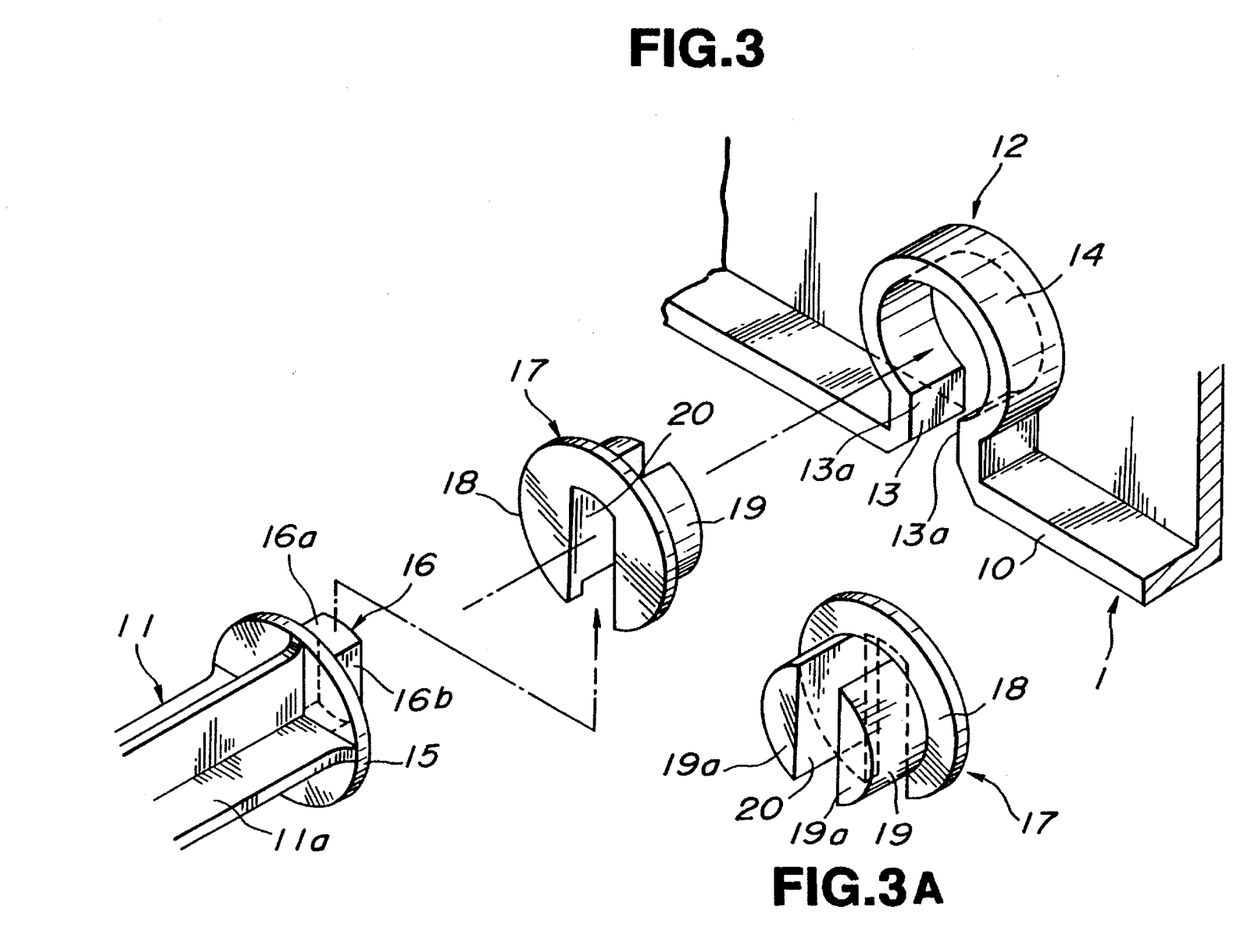
FIG. 3 is a fragmentary, enlarged, exploded perspective view of an essential part of the automatic transmission operating device of FIG. 1.
FIG. 3A is a perspective view of bushing 17 by itself.

The base member 2 is formed of a plastic or synthetic resin and has a horizontally extending shaft section 11. The base 1 is formed of a plastic or synthetic resin and formed at its bottom section with an opening 10. The base 1 is formed with two bearing sections 12 which are located respectively on opposite sides with respect to the opening 10 in order to rotatably support the shaft section 11 of the base member 2. As shown in FIG. 3, each bearing section 12 includes a cylindrical portion 14 which has a generally C-shaped cross-section so that a cutout groove 13 is formed extending downwardly. It will be understood that the cylindrical section 14 defines thereinside a generally cylindrical opening (no numeral) which merges with the cutout groove 13. See also FIG. 13A.

The shaft section 11 of the base member 2 includes a horizontally extending shaft portion 11a having a cross-shaped cross-section. Two disc portions 15 are formed integral respectively with the opposite ends of the shaft portion 11a. Each disc portion 15 is formed integrally with an end projection 16 which has a generally oval-shape cross-section and projects axially or laterally in the direction opposite to the shaft portion 11a. Each end projection 16 has an axial length which is generally equal to the axial length of the cylindrical section 14 of the bearing section 12. Each end projection 16 has two contacting or end faces 16a each of which is arcuate in cross-section and be in slidable contact with the cylindrical inner surface of the cylindrical portion 14 of the bearing section 12 of the base 1. It will be understood that each contacting face 16a forms part of a cylindrical surface so as to fit with the cylindrical surface of the cylindrical portion 14 of the bearing section 12. Each end projection 16 is formed such that its longitudinal axis X inclines to the axis of the shift lever 4 as shown in FIG. 1. More specifically, the longitudinal axis X of the end projection 16 forms a predetermined angle relative to the axis of the shift lever 4 on a plane (corresponding to FIG. 1) perpendicular to the axis of the shaft section 11. Each end projection has two parallel flat side faces 16b each of which is contiguous with the contacting faces 16a.

A bushing 17 as shown in FIG. 3 is engaged with or on the end projection 16 in order to cause the end projection 16 to smoothly rotate in the cylindrical portion 14 of the bearing section 12 upon being fitted in the cylindrical portion 14 and to prevent the end projection 16 from dropping off through the opening 10. The bushing 17 includes a generally cylindrical section 19 which includes two axially extending portions 19a each having a generally crescent-shaped cross-section. The two axially extending portions 19a, 19a have respective flat surfaces which are spaced from and parallel with each other to form therebetween a cutout groove 20 which extends axially from one end to the other end as shown in FIG. 3. A generally C-shaped flange section 18 is formed integral with the cylindrical section 19 and extend radially outwardly. The flange section 18 is cut out at a peripheral part thereof to form a cutout (no numeral) merging with the cutout groove 20. The flange section 18 is located at one end of the cylindrical section 19 which one end is brought into contact with the disc portion 15 of the shaft section 11 when the bushing 17 is engaged with the end projection 16 of the shaft section 11. It will be understood that the flat surfaces of the axially extending portions 19a, 19a are brought into contact with the flat surfaces 16b, 16b of the end projection 16 of the shaft section 11 when each bushing 17 is engaged with the end projection 16 of the shaft section 11.

The shift lever 4 is formed with an axially elongate opening (not shown) in which a positioning pin 23 is axially movably disposed and biased by a spring 24. The positioning pin 23 is disposed passing through the elongate opening in such a manner that the axis of the positioning pin 23 is perpendicular to the axis of the shift lever 4 at least on a plane parallel to the axes of the positioning pin 23 and the shift lever 4, as shown in FIG. 2. It will be understood that the cylindrical section 3 is formed with elongate openings (not shown) corresponding to the above-mentioned elongate opening of the shift lever 4. The positioning pin 23 is brought into engagement with one of detent grooves 22 of positioning plates 21, 21 formed integral with the base 1 so that the shift lever 4 is temporarily fixed to one of predetermined positions corresponding to the operating ranges of the automatic transmission.

Figure 4:
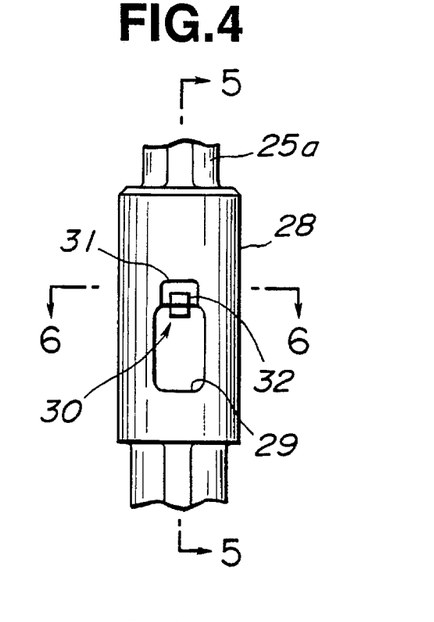
FIG. 4 is a fragmentary enlarged side view of a compression rod with a positioning pin, of the automatic transmission operating device of FIG. 1.
Figure 5:
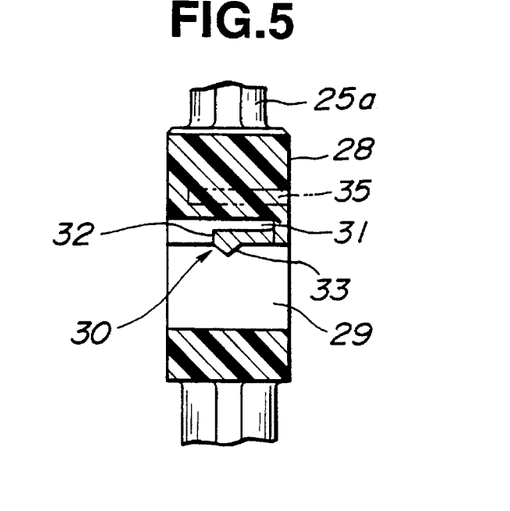
FIG. 5 is a sectional view taken in the direction of arrows substantially along the line 5—5 of FIG. 4.
Figure 6:
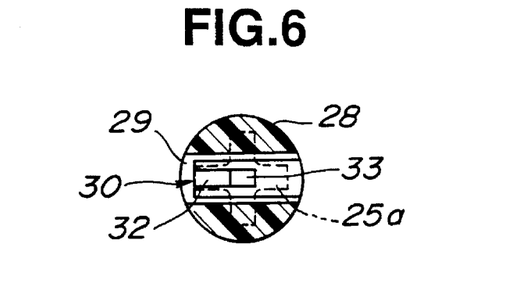
FIG. 6 is a sectional view taken in the direction of arrows substantially along the line 6—6 of FIG. 4.

The shift lever 4 is formed with an axially extending hollow (no numeral) in which a compression rod 25 is slidably disposed and engaged with a push button 27. The push button 27 is slidably disposed in a knob 26 fixedly mounted on the upper end of the shift lever 4. As shown in FIGS. 4 to 6, the compression rod 25 is a molded member formed of a plastic or synthetic resin and includes a rod section 25a having a cross-shaped cross-section and a predetermined length. The rod section 25a is formed with a support body section 28 which is located near the lower end of the rod section 25a and has a circular cross-section. The support body section 28 is formed with a hole 29 which extends generally diametrically so that the axis of the hole 29 perpendicular to the axis of the rod section 25a. The positioning pin 23 is fittingly disposed passing through the hole 29 and extends to the opposite sides with respect to the rod section 25a of the compression rod 25.

Figure 7:
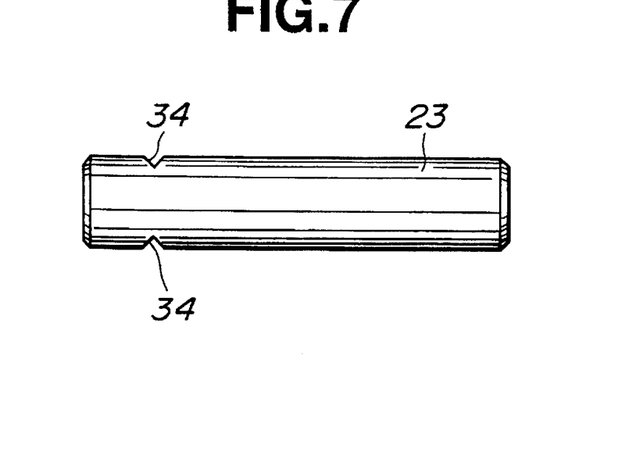
FIG. 7 is a front view of the positioning pin of FIG. 4.

An elastic stopper 30 is provided at the upper part of the hole 29 to be engageable with the positioning pin 23. The elastic stopper 30 includes a tongue-like portion 32 which is integral with the support body section 28 and protrudes from the peripheral portion of the support body section 28 to the central portion of the hole 29 to form a free tip end which is formed at its bottom face with a projection 33. The projection 33 is fitted in a groove 34 formed on the positioning pin 23 as shown in FIG. 7. The groove 34 may be formed at the central portion of the positioning pin 23. As seen from FIGS. 4 and 5, a space 31 is formed over the tongue-like portion 32 to allow the tongue-like portion 32 to move upwardly so as to effectively exhibit an elasticity of the elastic stopper 30. In order to improve the elasticity of the elastic stopper 30, a further space 35 may be formed over the space 31 in a manner to make the elastic stopper 30 U-shaped in cross-section as indicated in phantom in FIG. 5.

The manner of assembling the automatic transmission operating device D of the above embodiment will be discussed hereinafter.

First, a shift lever assembly S (indicated in phantom in FIG. 1) is assembled by incorporating the shift lever 4 without the knob 26, the spring 6 and the arm 7 into the base member 2. Then, the shift lever assembly S is inserted through the opening 10 located at the back side of the base 1. Thereafter, the shift lever 4 is inserted between the positioning plates 21, and then the base member 2 is inclined and kept in a position at which each of the end projections 16 of the shaft section 11 faces to the corresponding cutout groove 13 in a manner that the flat side faces 16b of each end projection 16 is in parallel with the parallel and spaced sufaces 13a, 13a (defining the cutout groove 13) of the bearing section 12, i.e., the end face 16a faces the cutout groove 13. In this state, the end projections 16 of the shaft section 11 are inserted through the cutout grooves 13 into the cylindrical portions 14 of the bearing sections 12, respectively. At this time, the bushings 17,. 17 have been fitted inside the cylindrical portions 14, 14 of the bearing sections 12, 12, respectively, in which the cutouts 13, 20 of the bearing section 12 and the bushing are brought into coincidence with each other.

Then, the shift lever assembly S is slightly turned rightward in FIG. 1 upon pulling the shift lever 4. At this time, the arm 7 is brought into contact with the projected upper end of the spring 6 at the lower surface of the arm 7 which surface is generally opposite to the projection 8 with respect to the arm 7, while the projection 8 of the arm 7 is brought into engagement with the check groove 9 thus forming a check mechanism M. Further, the positioning pin 23 is inserted into the hole 29 of the support body section 28 of the compression rod 25 in a manner that the projection 33 of the elastic stopper 30 is engaged in the groove 34 of the positioning pin 23. It will be understood that the positioning pin 23 is, of course, inserted through the elongate opening of the shift lever 4 and the elongate openings of the cylindrical section 3. Thus, the incorporation operation of the positioning pin 23 in the compression rod 25 is easily and swiftly completed.

Next, after the positioning pin 23 is brought into slidable contact with the detent grooves 22 of the positioning plates 21, the compression rod 25 is pushed down to move the shift lever 4 to a predetermined normal position for a normal operation of the shift lever 4, so that the end projection 16 of the shaft section 11 and the cutout groove 20 of the bushing 17 come to a position which is angularly separate from the cutout groove 13 of the bearing section 12 thereby preventing the end projection 16 from dropping off through the cutout groove 13. Then, the knob 26 is mounted on the upper end of the shift lever 4 so that the push button 27 comes to contact with the compression rod 25, thus completing the assembly of the automatic transmission operating device D.

It will be appreciated that, after the assembly of the automatic transmission operating device D, the end projection 16 can be prevented from dropping off through the cutout groove 13 even if the shift lever 4 is tilted by the maximum tilting angle from a "P" range to "2 (second)" or "3 (third)" range for the reason why the end faces 16a always cannot face the cutout groove 13 of the bearing section 12.

As discussed above, incorporation of the shift lever 4 into the base 1 and formation of the check mechanism M can be completed by only one operational step, thus largely reducing the number of operational steps conventionally required and therefore lowering the production cost. Additionally, the bushing 17 is fitted on the end projection 16 to compensate deficient parts of the end projection 16 as a right cylinder, and therefore the engaged end projection 16 and bushing 17 can smoothly rotate in the form of a one-piece inside the cylindrical portion 14 of the bearing section 12 although each end projection 16 is generally oval-shaped. This uniformalizes a load applied to the whole inner surface of the cylindrical portion 14 of the bearing section 12, thereby preventing a local wear of the sliding surface of the bearing section cylindrical portion 14.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. An operating device for an automatic transmission of a vehicle, comprising:

a base fixedly secured to a floor of the vehicle;

first and second bearing sections fixedly connected to said base and located apart from each other, each said bearing section including a generally cylindrical portion having a generally C-shaped cross-section so as to define a cutout groove;

a shift lever for selecting an operating range of the automatic transmission; and a base member to which said shift lever is fixedly connected, said base member including a shaft section having first and second ends, and first and second end projections which respectively axially project from the first and second ends, said first and second end projections being rotatably disposed respectively inside the cylindrical portions of said first and second bearing sections, each end projection being generally oval-shaped in cross-section so as to form two opposite end faces and two opposite side faces, said end faces being in sliding contact with an inner surface of the cylindrical portion of said bearing section, a distance between said two opposite end faces being larger than a width of said cutout groove, and the distance between the two side faces of each end projection being generally equal to the width of said cutout groove.

2. The operating device according to claim 1, wherein each end projection is located at an angular position relative to said shift lever, said angular position being other than a predetermined angular position at which one of the end faces of said end projection faces the cutout groove of said bearing section, each said end projection being located inside the cylindrical portion of said bearing section when the shift lever is in a position for a normal operation.

3. The operating device according to claim 2, wherein: each said end projection is located at said predetermined angular position before said end projection is fitted inside the cylindrical portion of a corresponding bearing section.

4. The operating device according to claim 1, wherein: the distance between said two end faces is generally equal to the inner diameter of the cylindrical portion of said bearing section.

5. The operating device according to claim 1, wherein:
said shift lever is perpendicular to said shaft section.

6. The operating device according to claim 1, further comprising:
first and second bushings, said first bushing being located between said first end projection and the cylindrical portion of said first bearing section, said second bushing being located between said second end projection and the cylindrical portion of said second bearing section, each said bushing including a generally cylindrical section formed with a cutout groove in which said end projection is fitted.

7. The operating device according to claim 1, wherein:
said base member is formed of a plastic.

8. The operating device according to claim 1, wherein:
said base is formed of a plastic.

9. An operating device for an automatic transmission of a vehicle, comprising:
a base fixedly secured to a floor of the vehicle;
first and second bearing sections fixedly connected to said base and located apart from each other, each said bearing section including a generally cylindrical portion having a generally C-shaped cross-section so as to define a cutout groove;
a shift lever for selecting an operating range of the automatic transmission; and
a base member to which said shift lever is fixedly connected, said base member including a shaft section having first and second ends, and first and second end projections which respectively axially project from the first and second ends, said first and second end projections being rotatably disposed respectively inside the generally cylindrical portions of said first and second bearing sections, each said end projection having a generally oval-shaped cross-section so as to form two opposite end faces and two opposite side faces, said end faces being in sliding contact with an inner surface of the generally cylindrical portion of said bearing section, a distance between said two opposite end faces being larger than a width of said cutout groove, and the distance between the two side faces of each end projection being generally equal to the width of said cutout groove;
said operating device being assembled by
locating each said end projection at a predetermined angular position at which one of the end faces of said shaft section end projection of said base member faces said cutout groove;
inserting each said end projection into the cylindrical portion of the corresponding bearing section through said cutout groove; and
rotating said base member to an extent that such said end face of each said end projection becomes disposed at a position other than said predetermined angular position.

10. An operating device of an automatic transmission of a vehicle, comprising:
a base fixedly secured to a floor of the vehicle;
first and second bearing sections fixedly connected to said base and located apart from each other, each bearing section including a generally cylindrical portion having a generally C-shaped cross-section so as to define a cutout groove;
a shift lever for selecting an operating range of the automatic transmission; and
a base member to which said shift lever is fixedly connected, said base member including a shaft section having first and second ends, and first and second end projections which respectively axially project from the first and second ends, said first and second end projections being rotatably disposed respectively inside the cylindrical portions of said first and second bearing sections, each of said end projections being generally oval-shaped in cross-section so as to form two opposite end faces and two opposite side faces, said end faces being in sliding contact with an inner surface of the cylindrical portion of said bearing section at all times when the shift lever is in a position for a normal operation, a distance between said two opposite end faces being larger than a width of said cutout groove, and the distance between the two side faces of each end projection being generally equal to the width of said cutout groove.

11. An operating device for an automatic transmission of a vehicle, comprising:
a base fixedly secured to a floor of the vehicle;
first and second bearing sections fixedly connected to said base and located apart from each other, each bearing section including a generally cylindrical portion having a generally C-shaped cross-section so as to define a cutout groove;
a shift lever for selecting an operating range of the automatic transmission;
a base member to which said shift lever is fixedly connected, said base member including a shaft section having first and second ends, and first and second end projections which respectively axially project from the first and second ends, said first and second end projections being rotatably disposed respectively inside the cylindrical portions of said first and second bearing sections, each said end projection being generally oval-shaped in cross-section so as to form two opposite end faces and two opposite side faces, said end faces being in sliding contact with an inner surface of the cylindrical portion of said bearing section at all times when the shift lever is in position for a normal operation, a distance between said two opposite end faces being larger than a width of said cutout groove and generally equal to an inner diameter of the cylindrical portion of said bearing section, and the distance between the two sides faces of each end projection being generally equal to the width of said cutout groove; and
means for locating each end projection at an angular position other than a predetermined angular position at which one of the end faces of said end projection faces the cutout groove of a corresponding one of said bearing sections, inside the cylindrical portion of said corresponding bearing section when the shift lever is in position for said normal operation.

12. An operating device for an automatic transmission of a vehicle, comprising:
a base fixedly secured to a floor of the vehicle;
first and second bearing sections fixedly connected to said base and located apart from each other, each bearing section including a generally cylindrical portion having a generally C-shaped cross-section so as to define a cutout groove;
a shift lever for selecting an operating range of the automatic transmission;
a base member to which said shift lever is fixedly connected, said base member including a shaft section having first and second ends, and first and second end projections which respectively axially project from the first and second ends, said first and second end projections being rotatably disposed respectively inside the cylindrical portions of said first and second bearing sections, each said end projection being generally oval-shaped in cross-section so as to form two opposite end faces and two opposite side faces, said end faces being in sliding contact with an inner surface of the cylindrical portion of said bearing section at all times when the shift lever is in a position for a normal operation, a distance between said two opposite end faces being larger than a width of said cutout groove and generally equal to an inner diameter of the cylindrical portion of said bearing section, the distance between the two side faces of each end projection being generally equal to the width of said cutout groove; and means for locating each end projection at an angular position other than a predetermined angular position at which one of the end faces of said end projection faces the cutout groove of a corresponding one of said bearing sections, inside the cylindrical portion of said corresponding bearing section when the shift lever is in position for said normal operation.

* * * * *